US012624632B2

(12) United States Patent
Bodley

(10) Patent No.: US 12,624,632 B2
(45) Date of Patent: May 12, 2026

(54) DOWN HOLE MEASUREMENT SYSTEM

(71) Applicant: MTI Group Pty Ltd, Wangara (AU)

(72) Inventor: Nicholas Bodley, Wangara (AU)

(73) Assignee: MTI Group Pty Ltd, Wangara (AU)

( * ) Notice: Subject to any disclaimer, the term of this patent is extended or adjusted under 35 U.S.C. 154(b) by 0 days.

(21) Appl. No.: 17/542,741

(22) Filed: Dec. 6, 2021

(65) Prior Publication Data

US 2022/0333481 A1 Oct. 20, 2022

Related U.S. Application Data

(63) Continuation of application No. PCT/AU2020/050583, filed on Jun. 8, 2020.

(30) Foreign Application Priority Data

Jun. 6, 2019 (AU) ................................ 2019901972

(51) Int. Cl.
| | |
|---|---|
| *E21B 47/04* | (2012.01) |
| *E21B 47/13* | (2012.01) |
| *G01F 23/00* | (2022.01) |

(52) U.S. Cl.
CPC .............. *E21B 47/04* (2013.01); *E21B 47/13* (2020.05); *G01F 23/0023* (2013.01)

(58) Field of Classification Search
CPC ......... E21B 47/04–053; G01F 23/0023; G01B 7/02; G01B 7/026; G01B 5/18
See application file for complete search history.

(56) References Cited

U.S. PATENT DOCUMENTS

| | | | | |
|---|---|---|---|---|
| 1,695,701 | A | * 12/1928 | Steiner | .................... G01F 23/44 |
| | | | | 33/312 |
| 2,934,695 | A | 4/1960 | Maulsby | |
| 3,067,519 | A | * 12/1962 | Swift | ...................... E21B 47/04 |
| | | | | 33/736 |
| 3,311,983 | A | 4/1967 | Green | |

(Continued)

FOREIGN PATENT DOCUMENTS

| | | | | |
|---|---|---|---|---|
| CN | 109307544 | A * 2/2019 | ............... G01B 7/26 |
| EP | 0361996 | B1 9/1992 | |

(Continued)

OTHER PUBLICATIONS

International Preliminary Report on Patentability in counterpart International Application No. PCT/AU2020/050583, dated Sep. 28, 2021, 7 pages.

(Continued)

*Primary Examiner* — Judy Nguyen
*Assistant Examiner* — James Split
(74) *Attorney, Agent, or Firm* — Edell, Shapiro & Finnan, LLC

(57) ABSTRACT

A bore hole measurement system includes a cable with spaced apart embedded elements along a length of the cable, a sensor for detection of the elements as they move relatively past the sensor, and a processor for determining the distance that the cable has travelled based on the detections of elements that have moved past the sensor. A method includes detecting the elements moving past a sensor, and determining the distance that the cable has travelled based on the detections of elements that have moved past the sensor.

18 Claims, 11 Drawing Sheets

(56) References Cited

U.S. PATENT DOCUMENTS

| | | | | |
|---|---|---|---|---|
| 3,566,478 | A | | 3/1971 | Hurlston |
| 3,909,948 | A | * | 10/1975 | Markfelt ............... G01F 23/245 |
| | | | | 33/720 |
| 4,117,600 | A | | 10/1978 | Guignard et al. |
| 4,179,817 | A | | 12/1979 | Lavigne et al. |
| 4,226,184 | A | * | 10/1980 | Ljungberg ................ F42B 3/26 |
| | | | | 102/322 |
| 4,662,209 | A | | 5/1987 | Brown |
| 4,718,168 | A | | 1/1988 | Kerr |
| 4,797,822 | A | * | 1/1989 | Peters .................... E21B 47/04 |
| | | | | 33/304 |
| 5,120,905 | A | * | 6/1992 | Cousin ................... H01B 7/182 |
| | | | | 174/113 C |
| 5,469,916 | A | * | 11/1995 | Sas-Jaworsky ....... E21B 47/092 |
| | | | | 138/104 |
| 5,593,524 | A | * | 1/1997 | Philips ................. H01B 13/268 |
| | | | | 156/244.12 |
| 6,561,451 | B1 | | 5/2003 | Steinich |
| 6,563,303 | B1 | | 5/2003 | Watkins |
| 7,021,137 | B1 | | 4/2006 | Milone |
| 8,342,609 | B2 | * | 1/2013 | Holdcroft ............... E21C 37/14 |
| | | | | 299/13 |
| 8,959,787 | B2 | * | 2/2015 | Stephens ................ G01F 23/72 |
| | | | | 33/1 PT |
| 10,208,585 | B2 | * | 2/2019 | Surowinski ............. E21B 47/00 |
| 10,273,798 | B2 | * | 4/2019 | McFarland .............. H01B 7/36 |
| 12,091,965 | B2 | * | 9/2024 | Stewart .................... G01B 7/04 |
| 2009/0248307 | A1 | | 10/2009 | Barrow et al. |
| 2018/0106584 | A1 | | 4/2018 | Santos et al. |
| 2019/0316461 | A1 | * | 10/2019 | Cavanough ............. G01P 15/00 |

FOREIGN PATENT DOCUMENTS

| | | | | | |
|---|---|---|---|---|---|
| EP | | 2983175 A1 | * | 2/2016 | .............. H01B 3/04 |
| EP | | 1806473 B1 | | 12/2016 | |
| RU | | 2622468 C1 | | 6/2017 | |
| WO | WO-2014063188 A1 | | * | 5/2014 | .............. F42D 1/10 |
| WO | | 2015065477 A1 | | 5/2015 | |
| WO | | 2015188082 A1 | | 12/2015 | |

OTHER PUBLICATIONS

International Search Report, PCT/AU2020/050583, Jul. 17, 2020, 5 pages.
International Search Report (Revised Version), PCT/AU2020/050583, Feb. 9, 2021, 4 pages.

* cited by examiner

50

52

Position Sensor System

54

Feed cable into blasthole

56

Count elements on cable that pass sensor

58

Measure conditions while lowering probe

60

Land probe at bottom of blast hole

62

Communicate measurements to electronic system

64

Process measurement data

66

Display measurement data

DOWN HOLE MEASUREMENT SYSTEM

CROSS-REFERENCE TO RELATED APPLICATIONS

This application is a continuation of PCT/AU2020/050583, filed Jun. 8, 2020, which claims priority to AU patent application No. 2019901972, filed Jun. 6, 2019, the disclosures of which are incorporated herein by reference in their entireties.

FIELD

The present invention relates to a tool for measuring properties, such as the depth, of a drilled blast hole.

BACKGROUND

A known method of drilling and blasting a volume of earth to extract mineral bearing material is to generate a blast pattern which describes a number of holes to be drilled, such as in pit. A drill rig drills these holes. A quality control step takes place to measure the drilled holes to ensure they are as designed and redrilled as required. Following this the holes are loaded with explosives and stemming ready to blast. A blast pattern may comprise many hundreds of holes. Many factors may cause the hole to not match that required in the blast pattern. These factors may include water in the hole, cave-ins due to ground conditions, drill rig inaccuracy, voids present in the ground and other reasons. Drilled patterns may be left on shot for many days between drilling and loading, which allows weather to cause issues in the holes. As such, quality control is a necessary step before blasting to minimise explosives use and ensure the blast matches the plans.

A typical quality control process utilises a tape measure with a weight on the end of it. The responsible person throws the weight down the hole and uses the tape to measure the depth of the hole. Water depth is inferred by "bobbing" the weight which, depending on the operator, can lead to inaccurate results. If the recorded measurements vary from the designed blast pattern, the hole will be redrilled. The blast pattern is an extremely high-risk environment, and personnel responsible for this process are highly paid. Innovations such as autonomous drills and camera operated MMU's have resulted in improved efficiency and less workers on pattern in the drill and blast space, but no technological solution has been successful in improving the efficiency of measuring the depth of a blast hole for quality control.

SUMMARY

According to the present invention there is provided a bore hole measurement system comprising:
a cable comprising spaced apart embedded elements along a length of the cable;
a sensor for detection of the elements as they move relatively past the sensor;
a processor for determining the distance that the cable has travelled based on the detections of elements that have moved past the sensor.

In an embodiment the cable comprises an electrical wire core for communication with instruments downhole for measurement of the bore hole.

In an embodiment the sensor is a magnetic or induction sensor. Preferably the sensor is an induction sensor.

In an embodiment the sensor comprises a hole through which the cable passes.

In an embodiment the sensor comprises a toroid.

In an embodiment the elements are ferrous. Preferably the elements are metallic.

In an embodiment the elements evenly spaced along at least a portion of the length of the cable. In the preferred embodiment the elements are spaced 0.1 m, 0.2 m, 0.25 m or 0.5 m apart, most preferably 0.2 m apart.

In an embodiment the cable is resistant to stretching. Preferably the cable is fibre reinforced and stretches less than 0.05 m over a 20 m length.

In an embodiment the cable comprises an outer layer of a polyurethane or poly tetrafluoroethylene.

In an embodiment the cable comprises probe at an end of the cable and at least one wire for transmitting a plurality of signals from the probe.

In an embodiment the probe comprises multiple sensors for detection of the end of the cable encountering an event.

In an embodiment the probe comprises a water detector and the event is the detection of water.

In an embodiment the processor is configured to determine the depth of the water based on the number of elements that have moved past the sensor between when the probe encounters water and when the probe encounters the bottom of the hole.

In an embodiment the probe comprises a temperature sensor. In an embodiment the sensor comprises an infrared temperature measurement sensor.

In an embodiment the probe comprises distance sensor and the event is the detection of a void laterally extending from the bore hole. The distance sensor could utilise radar, laser, ultrasonic, mechanical or a combination of these to detect and/or measure the void.

In an embodiment the probe comprises of an electronic instrument, such as, for example, a gyrometer, magnometer or accelerometer, for detection of tilting and in the event of the probe touching the bottom of the bore hole. The preferred embodiment includes both a gyrometer and accelerometer.

In an embodiment the probe comprises an accelerometer for measuring a change in speed of decent of the cable into the bore hole. In an embodiment the event is detection of the probe stopping or encountering the bottom of the hole.

In an embodiment the processor is configured to ignoring detection of movement of the elements past the sensor when the end of the cable has stopped.

Also according to the present invention there is provided a method of making a measurement of a bore hole comprising:
providing a cable comprising spaced apart embedded elements along a length of the cable;
detecting the elements moving past a sensor;
determining the distance that the cable has travelled based on the detections of elements that have moved past the sensor.

In an embodiment the method further comprises detection of the end of the cable encountering an event. In an embodiment the event comprises the end of the cable encountering the bottom of the hole. In an embodiment the event comprises the end of the cable encountering water. In an embodiment the method further comprises determining the depth of the water based on the detections of elements that have moved past the sensor between the time of encountering water and the time of encountering the bottom of the hole. In an embodiment the method further comprises detecting that a probe at an end of the cable down the bore hole has stopped. The method further comprises ignoring detection of movement of the elements past the sensor when the end of the cable has stopped.

Any document, reference, patent application or patent that might be cited in this text is expressly incorporated herein in their entirety by reference, which means that it should be read and considered by the reader as part of this text. That the document, reference, patent application, or patent cited in this text is not repeated herein is merely for reasons of conciseness.

In this specification, where a literary work, act or item of knowledge (or combinations thereof), is discussed, such reference is not an acknowledgment or admission that any of the information referred to formed part of the common general knowledge as at the priority date of the application. Such information is included only for the purposes of providing context for facilitating an understanding of the inventive concept/principles and the various forms or embodiments in which those inventive.

For the purpose of describing the invention, a 'blast hole' may also comprise a drill hole, bore hole, or another type of hole.

Various aspects or embodiments described herein can be practiced alone or combination with one or more of the other aspects/embodiments, as will be readily appreciated by those skilled in the relevant art. The various aspects can optionally be provided in combination with one or more of the optional features described in relation to the other principal aspects. Furthermore, optional features described in relation to one example (or embodiment) can optionally be combined alone or together with other features in different examples or embodiments.

For the purposes of summarising the aspects, certain advantages and novel features have been described herein above. It is to be understood, however, that not necessarily all such advantages may be achieved in accordance with any particular embodiment or carried out in a manner that achieves or optimises one advantage or group of advantages as taught herein without necessarily achieving other advantages as may be taught or suggested herein.

BRIEF DESCRIPTION OF THE DRAWINGS

Further features of the invention are described in the following description of several non-limiting embodiments thereof. This description is included solely for the purposes of exemplifying the inventive principles. It should not be understood as a restriction on the broad summary, disclosure or description as set out above. The description is made with reference to the accompanying drawings in which.

Figure 1:
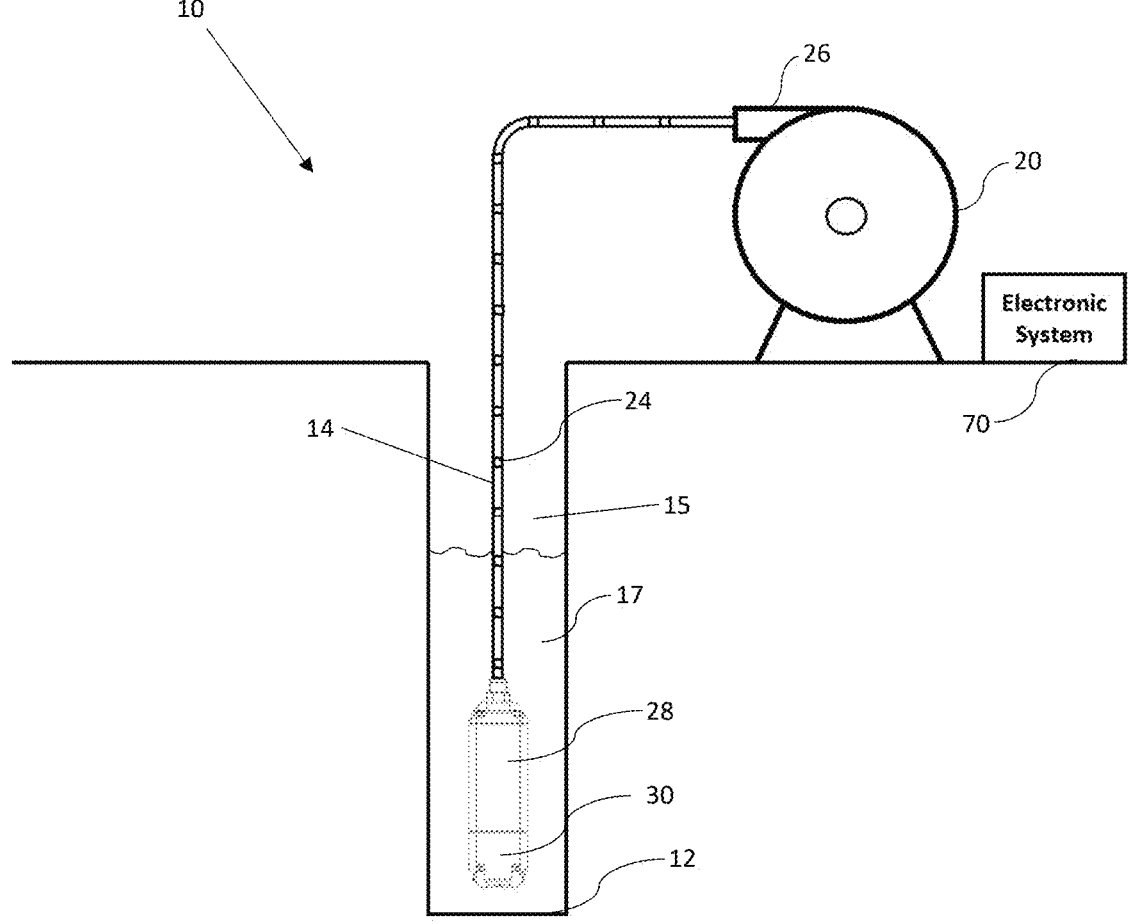
FIG. 1 is a side view of a blast hole measurement system according to an embodiment of the invention.

In the figures, like elements are referred to by like numerals throughout the views provided. The skilled reader will appreciate that elements in the figures are illustrated for simplicity and clarity and have not necessarily been drawn to scale. For example, the dimensions and/or relative positioning of some of the elements in the figures may be exaggerated relative to other elements to facilitate an understanding of the various embodiments exemplifying the principles described herein. Also, common but well understood elements that are useful or necessary in a commercially feasible embodiment are often not depicted to provide a less obstructed view of these various embodiments. It will also be understood that the terms and expressions used herein adopt the ordinary meaning as is accorded to such terms and expressions with respect to their corresponding respective areas of inquiry and study except where specific meanings have otherwise been set forth herein.

It should be noted that the figures are schematic only and the location and disposition of the components can vary according to the arrangements of the embodiment(s) as well as of the particular applications of such embodiment(s).

Specifically, reference to positional descriptions, such as 'lower' and 'upper', and associated forms such as 'uppermost' and 'lowermost', are to be taken in context of the embodiments shown in the figures, and are not to be taken as limiting the scope of the principles described herein to the literal interpretation of the term, but rather as would be understood by the skilled reader.

Embodiments described herein may include one or more range of values (eg. size, displacement and field strength etc). A range of values will be understood to include all values within the range, including the values defining the range, and values adjacent to the range which lead to the same or substantially the same outcome as the values immediately adjacent to that value which defines the boundary to the range.

Other definitions for selected terms used herein may be found within the detailed description and apply throughout. Unless otherwise defined, all other scientific and technical terms used herein have the same meaning as commonly understood to one of ordinary skill in the art to which the embodiment(s) relate.

DETAILED DESCRIPTION

The words used in the specification are words of description rather than limitation, and it is to be understood that various changes may be made without departing from the spirit and scope of any aspect of the invention. Those skilled in the art will readily appreciate that a wide variety of modifications, alterations, and combinations can be made with respect to the above described embodiments without departing from the spirit and scope of any aspect of the invention, and that such modifications, alterations, and combinations are to be viewed as falling within the ambit of the inventive concept.

Throughout the specification and the claims that follow, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

Referring to FIG. 1, there is shown a measurement apparatus 10 comprising a flexible cable 14 for insertion into a hole 15, such as a blast hole to be filled with explosives. The cable 14 has embedded metallic or ferrous elements 24 placed equally spaced along its length. The elements will typically be underneath the outermost layer of the cable 14. The spacing may be, for example, 0.5 m apart, 0.2 m apart or 0.1 m apart. Preferably the metallic elements can be detected by an induction sensor 26, and are for example copper or steel. Preferably the ferrous elements can be detected by magnetic sensor 26. For example, in one embodiment the ferrous elements are a magnet, or in another embodiment an alloy of a magnetic metal (iron, nickel, or cobalt). The cable 14 comprises an electrical wire(s) core that allows for communication between a probe 28 at a down hole end (downhole) and an electronic or computing system 70 above ground (uphole). The elements 24 are sized such that a sensor 26, preferably uphole, can detect them clearly. The cable 14 comprises fibreglass extending along its length, preferably to avoid stretching of the cable 14. The most preferred form of the elements 24 is copper crimps about the core and fibreglass. In an embodiment, the cable 14 is protected by an outer layer, preferably of a polyurethane, or poly tetrafluoroethylene (such as Teflon™) which reduces wear damage to the cable 14 and protects the elements 24 underneath.

Figure 12:
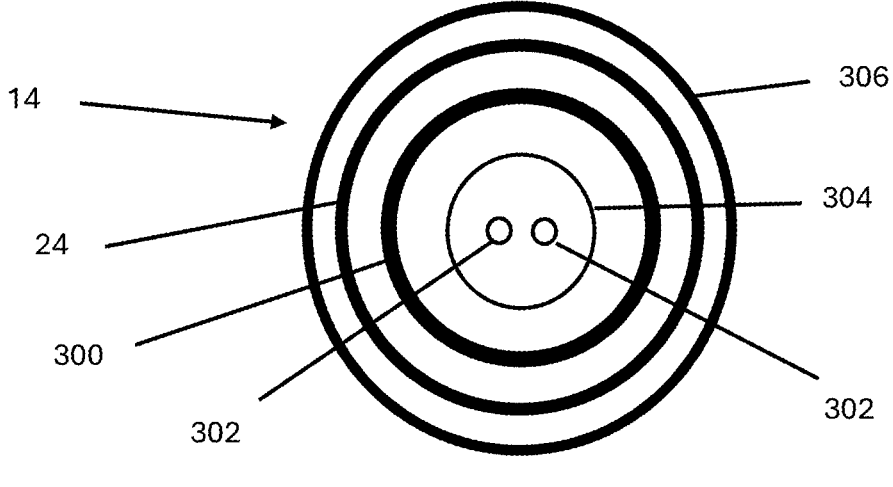
FIG. 12 is a schematic cross-section of a cable of the blast hole measurement system of FIG. 1.

Shown in FIG. 12 is a cross section of the cable 14. One of the embedded elements 24 is under the outer protective layer 306 which comprises polyurethane or poly tetrafluoroethylene. The fiberglass layer 300 surrounds the electrical wire core 304 in this example comprising two wires 302.

A downhole probe 28 terminates the end of the flexible cable 14. The probe 28 comprises internal electronic sensors 30 connected via wires of the flexible cable 14 to electronics 70 on the surface. These electronic sensors 30 allow for measurement of parameters such as temperature, presence of water, presence of voids, acceleration of the probe and orientation. Other electronic sensors may be included in the future.

A sensor system 26 is at the top of the hole (uphole). The flexible cable 14 passes by or through the sensor system 26 to detect the passing of the embedded elements 24. The sensor system 26 is preferably an electronic circuit comprising, for example, a reed switch if the element is a magnet, or for example an inductive sensor that varies the magnetic flux through a coil as the element passes which variation in the magnetic flux is sensed by another or the same coil. In a further alternative the element may be a near field device with an identification, which identification is detected as it passes by the sensor. In an embodiment the sensor system 26 produces signal indicative of the passing of the element. A preferred form of the sensor system 26 comprises a set of two or more induction sensors spaced along the path of the cable 14, preferably about 10 cm apart. These can be used to determine the direction travel of the cable 14 according to the sequence of detection of the elements. More preferably there are three induction sensors as this improves the accuracy and reliability of the direction detection by removing interference and the prospects of false positives.

The uphole sensor system 26 is operatively connected to the electronic/computer system 70. Counting the elements 24 passing the sensor 26, and knowing the fixed distance between the elements 24, allows the electronic/computer system 70 to calculate the distance the cable 14 has travelled. This sensor system 26 is typically installed at the top of the hole 15. The electronic/computer system 70 processes the data from the downhole probe 28 and the uphole sensor 26 and then outputs the depth of hole and other parameters to a user on either a display on it, via a tablet display attached to the device or via a connection to a phone or other wireless device. In an embodiment this sensor system 26 may mount onto a mechanical hose reel 20 onto which the cable 14 is wound.

The sensors 30 of the probe 28 comprises one or more of the following:

(a) a water detector (such as an electronic continuity/ conductivity detector) for detecting when the probe enters water; a thermometer for measuring temperature;

(b) an accelerometer for sensing when the probe 28 is stationary, dropping, or stops which is typically used to detect the probe 28 encountering the bottom of the hole 12, but may be used to sense when the probe encounters water by a change in acceleration, which will be different to the change in acceleration due to encountering the bottom of the hole;

(c) a gyroscope for sensing the orientation of the probe 28 and the bottom of the hole;

(d) a temperature sensor for measuring and logging the temperature of the hole along its depth (e) a distance sensor/mechanism used to detect voids in the hole.

Figure 4:
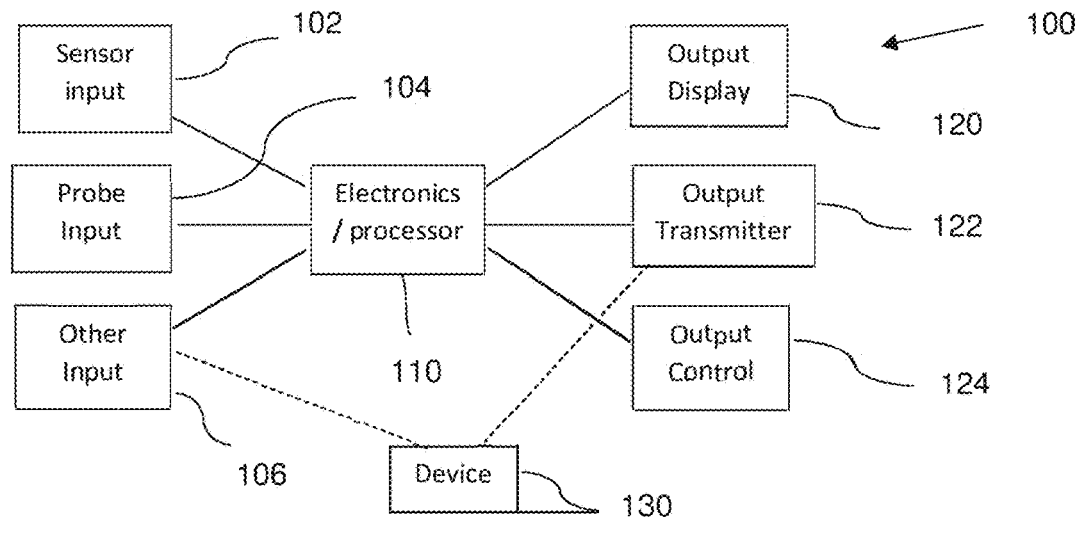
FIG. 4 is a block diagram of a computer system according to an embodiment of the present invention.

Referring to FIG. 4, an embodiment 100 of the electronic/ computer system 70 is shown. The embodiment 100 may be in the form of a computer system comprising uphole sensor input 102, downhole probe input 104 and other input 106, a processor 110 and an output display 120, an optional output transmitter 122 and other/control output 124. The sensor input 102 receives the signals from the sensor 26. The probe input 104 receives the signals from the sensors 30 of the probe 28. The other input 106 may receive input signal from a device 130, such as a portable computing device/remote control or the like and the device 130 may receive a transmission of outputs from the processor 110 via the output transmitter. The transmission may be for example by Bluetooth, Wi-Fi, LoRa or other suitable protocol, or a wired connection. The processor 110 may operate under the control of computer program instructions, firmware instructions or be a programmed logic controller. Further it may be purpose built electronic circuits.

The output display 120 may be for example of computer-controlled screen, an LCD or LED display. In one variation, the output 124 may control a motor on the hose reel 20 which is able to wind the reel to raise or lower the cable 14 from the reel 20. The other input 106 may be able to receive commands from an operator to control the motor or record data.

Figure 2:
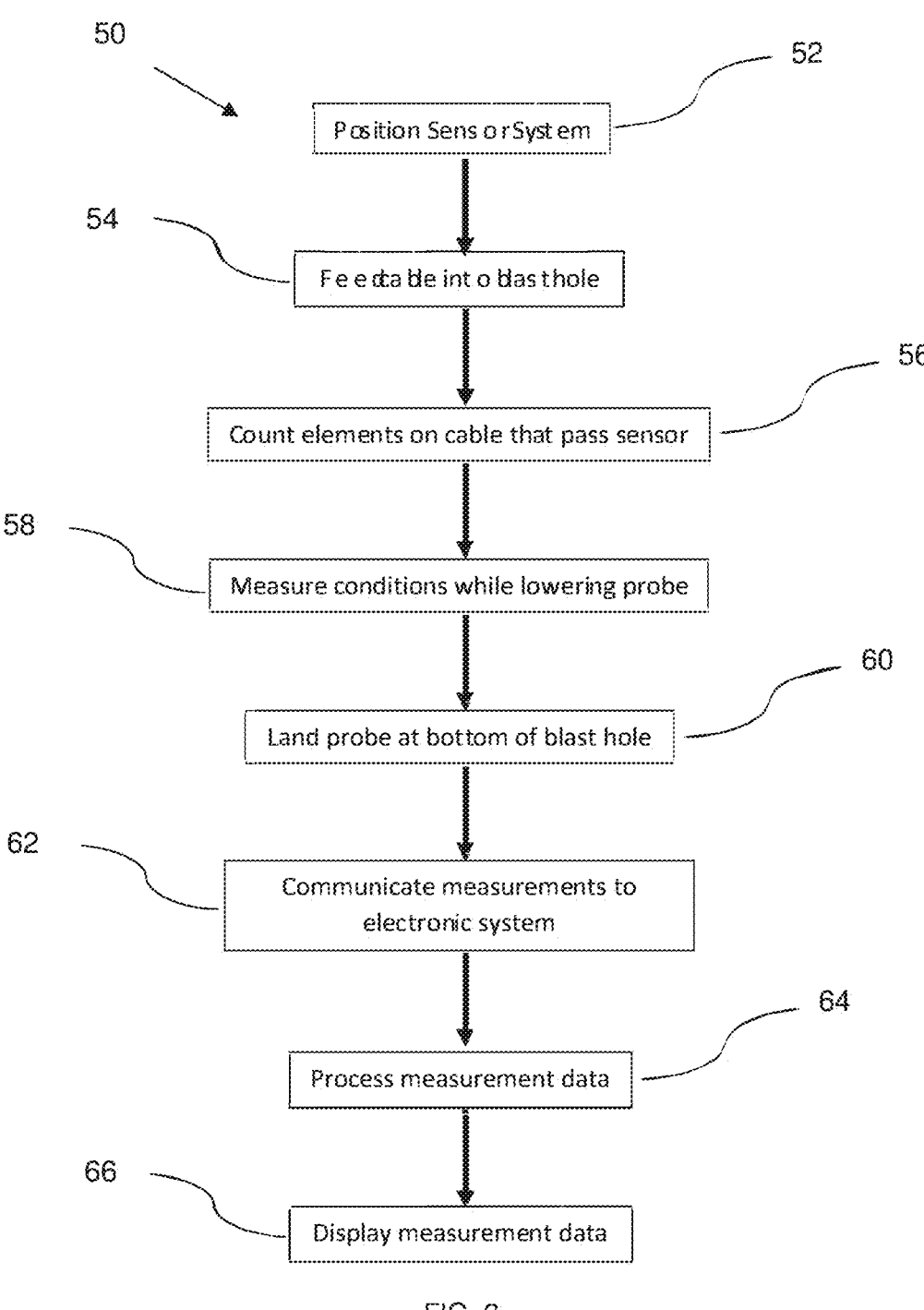
FIG. 2 is a flow chart showing a method according to an embodiment of the invention.

FIG. 2 is a flow chart of a method 50 for installing, measuring, and displaying data measured according to an embodiment of the present invention is shown. Installation of the system includes positioning 52 of the uphole system 26 at a desired position about the blast hole 10. Typically, this will be just above/adjacent the entry to the hole 15. The flexible cable 14 with embedded elements 24 is fed 54 through the sensor system 26. As the downhole probe system 28 runs into the blast hole 10 each embedded element 24 passing through the sensor system 26 is detected. This produces a count 56. Each count resulting from the passing of a element 24 on the flexible cable can be related to a fixed length to determine amount of cable 14 that has passed the sensor, which in turn indicates the depth of the blast hole 15. The probe 28 has sensors 30 which measure 58 conditions during the descent, such as to detect encountering water 17 and to calculate water level (if present). The sensors 30 also detect 60 the end of the descent, such when the accelerometer detects deceleration to zero velocity (or that the cable is no longer moving past the sensor 26). The count of the elements 24 that have moved past/through the sensor 26 is used to determine the total depth of the blast hole 15. Separately, or as acquired, the measurements from the sensors 30 can be communicated 62 to the electronic/computer system 70 through the electrical wire core of the flexible cable 14. The electronic/computer system 70 then processes 64 the data measured by the downhole probe system 26. Processed data is then able to be displayed 66 by various means such as connected display of connection to phone, tablet or another wireless device.

Figure 3:
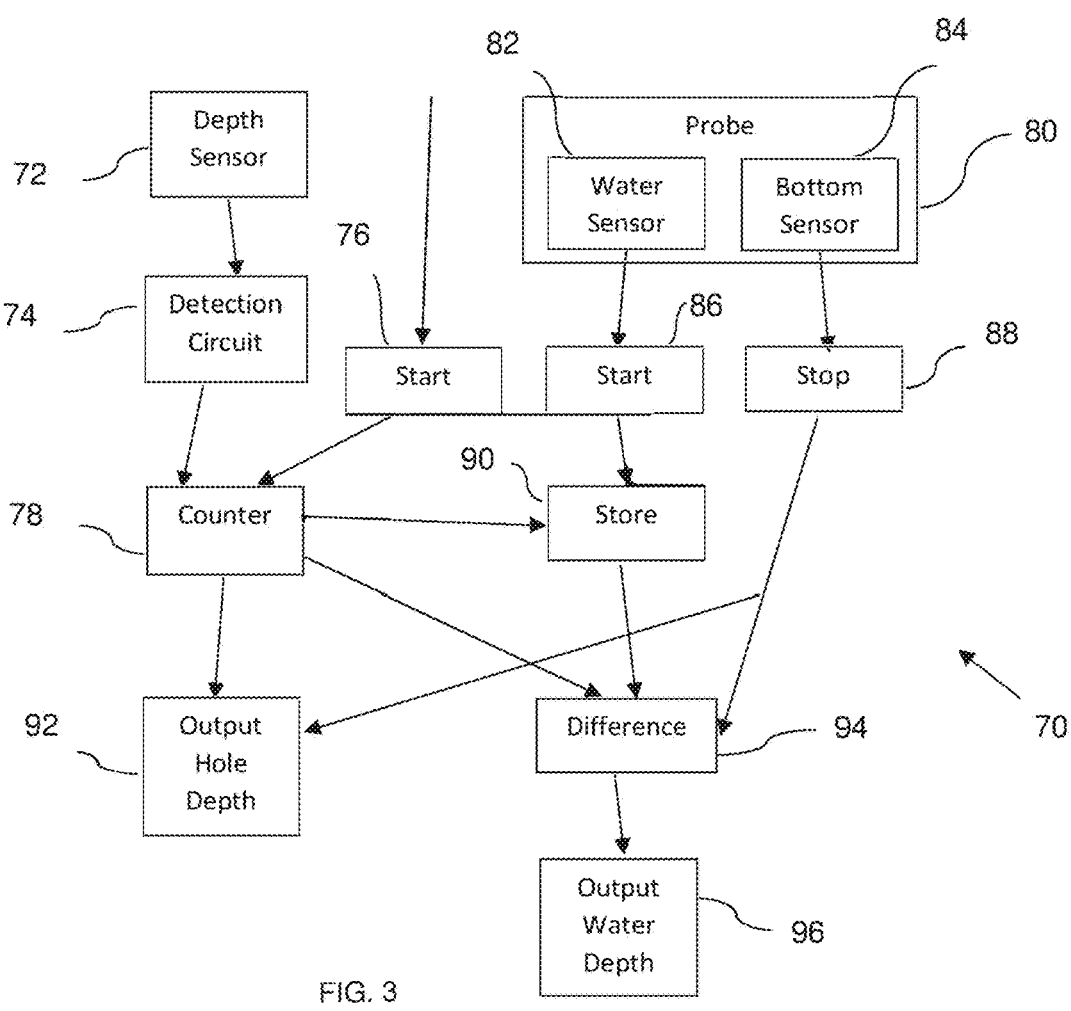
FIG. 3 is a block diagram showing a measuring apparatus according to an embodiment of the present invention.

An example implementation 70 is described in relation to FIG. 3. The sensor 26 is configured as an inductive sensor 72 which detected each time one of the ferrous elements 24 passes. It comprises an electronic circuit 74 to produce a pulse electronic signal for each passing of one of the elements 24. The pulses are counted by a counter circuit 78. The counter circuit may be reset and commences counting upon receiving a start signal from a start circuit 76. The start circuit 76 may produce the start signal when the cable 14 commences being lowered into the hole 15. It could also triggered by a manual switch activated by an operator, or it could be triggered by the first element passing the sensor 26 being different and triggering the start circuit, or by other suitable means. The start signal will start the counter circuit counting from a reset status.

The probe sensors 30 may be configured as 80 a sensor package comprising a bottom sensor 84. For example, the accelerometer may detect a sudden deceleration and a bottom sensor circuit 84 is able to detect and produce a stop signal 88. The stop signal causes an output 92 to provide the counter's 78 current count, or an amount based thereon, as the hole depth. For example, if the elements are spaced 0.2 m apart and the counter is up to 100, then the hole is 20 m deep.

The sensors package 80 may comprise a water sensor, distance sensor and temperature sensor 82. For example, the conductivity sensor may detect a current flow through water. This event may configured to produce a start signal 86 based on a sensor exceeding a threshold value as desired which causes the current count of the counter 78 to be stored in a storage 90. When the stop signal 88 is received this also causes stored count to be subtracted by a difference circuit 94 from the counter's 78 current count. This difference will indicate the number of elements of depth of the event in the hole 15. This depth of the event can be provided by output 96. For example, if the elements are spaced 0.2 m apart and the difference is 25, and the water sensor event is triggered, then the water depth in the hole is 5 m deep.

In this way, a portable electronic depth measuring system 10 is provided for the purpose of measuring the depth, water level, presence of voids, temperature and potentially other parameters of a blast hole 15. This is useful to measure the depth of a hole and or water in the hole (or other parameters) in a drill & blast environment.

Figure 5:
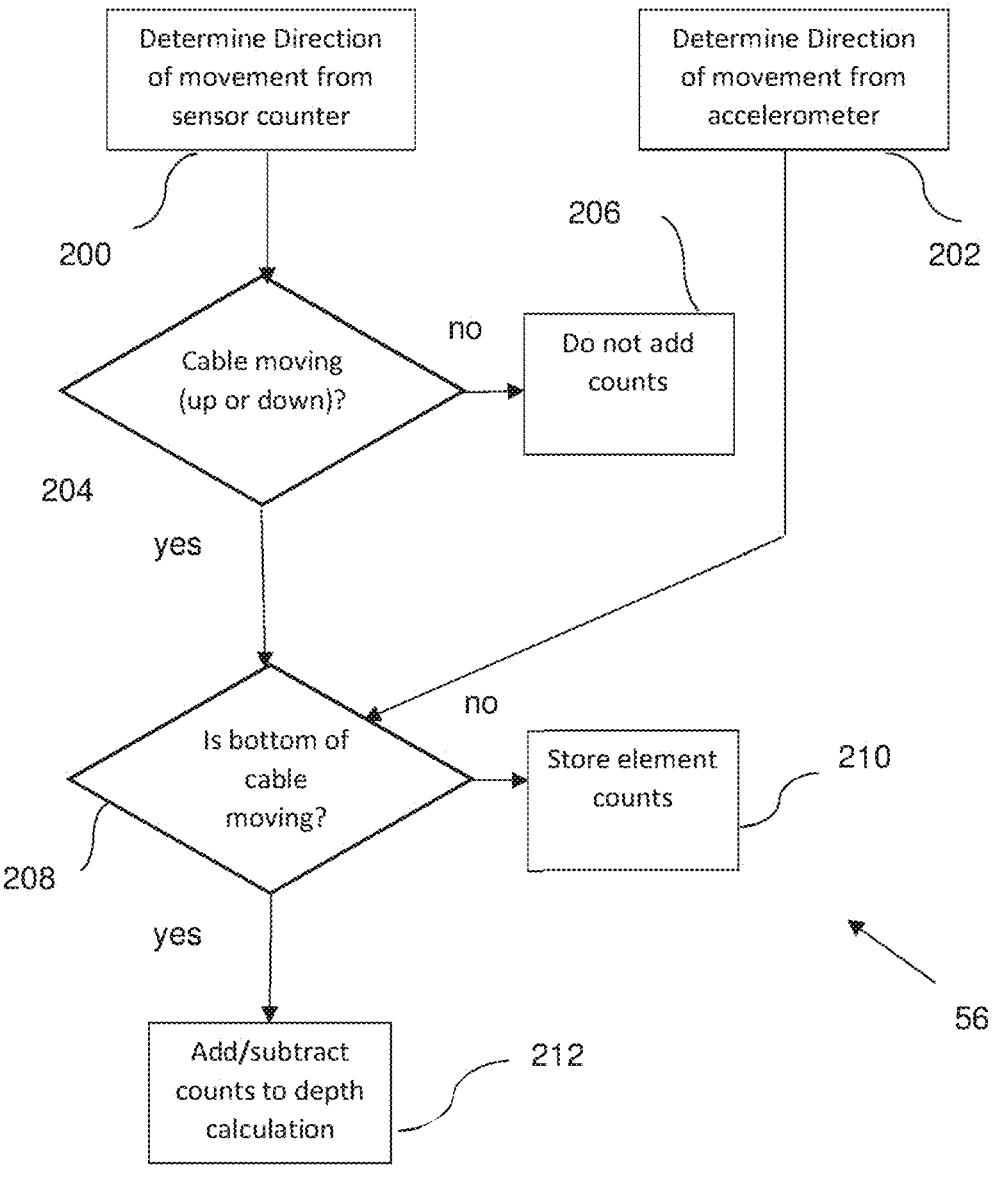
FIG. 5 is a flowchart showing a method of counting elements.

FIG. 5 shows a more detailed embodiment of counting the elements on the cable that pass the sensor from step 56 of FIG. 2. In this embodiment the sensor system 26 includes 3 induction sensors in series which determine the direction the cable is moving at step 200. If no counts are detected the process at 206 returns and checks again. At 202 the accelerometer is used to determine whether the cable is moving and can also be used to determine the direction of movement. When counts are detected and the cable is moving according to the sensor system 26, the accelerometer can be used to determine at 208 whether the end of the able has stopped either because of contact with the bottom of the bore hole or that it has become struck. If, the end of the cable has stopped then any further counts of elements from that point are not added but instead is stored at 210. A set of dipping actions can then be used to determine whether the cable is at the bottom (each dip results in the same stopping of the end of the cable) or is stuck (because the cable travels beyond the point at which it stopped). When stuck the count can be added again once it begins travelling down again. However, if the end is moving and the sensor system indicated moving, at 212, each count is added until the end reaches the bottom, which is determined again at step 208.

Figure 6:
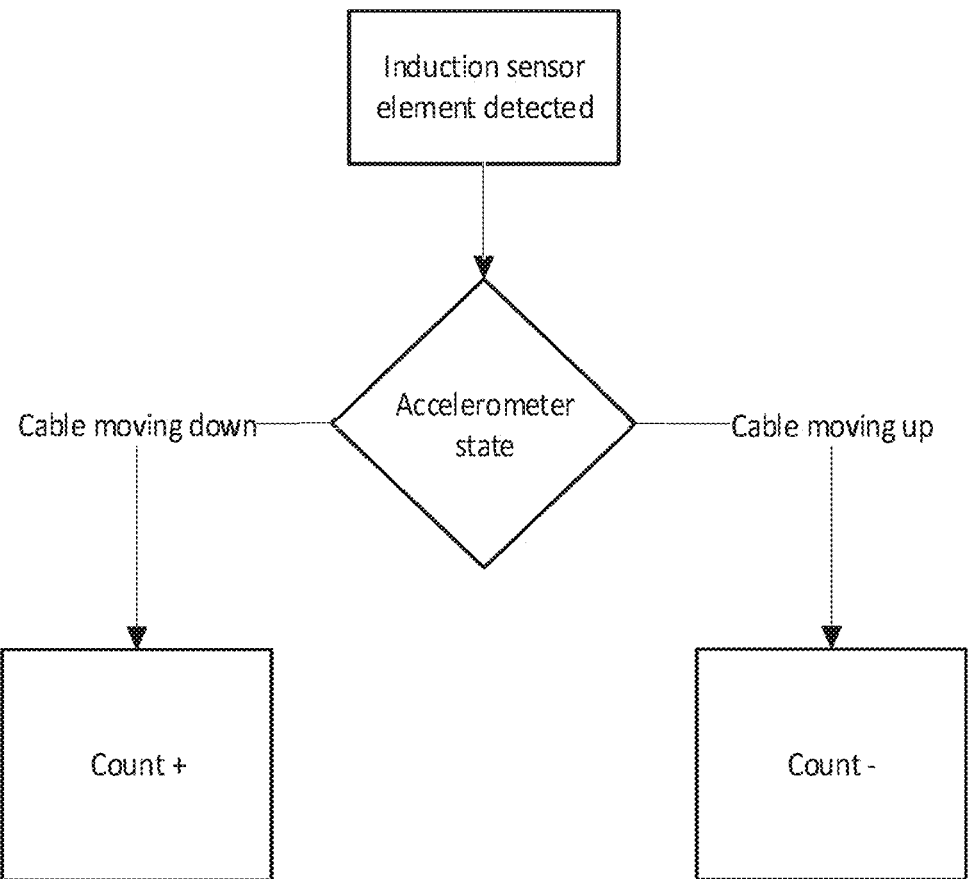
FIG. 6 is a flowchart showing another method of counting elements.

FIG. 6 shows a simple form of counting elements, where this is only one sensor, such as an induction sensor and the accelerometer determines whether the cable 14 is moving up or down and when moving down each element passing the sensor adds one to the count and when the accelerometer is moving up for each element passing the sensor subtracts one to the count.

Figure 7:
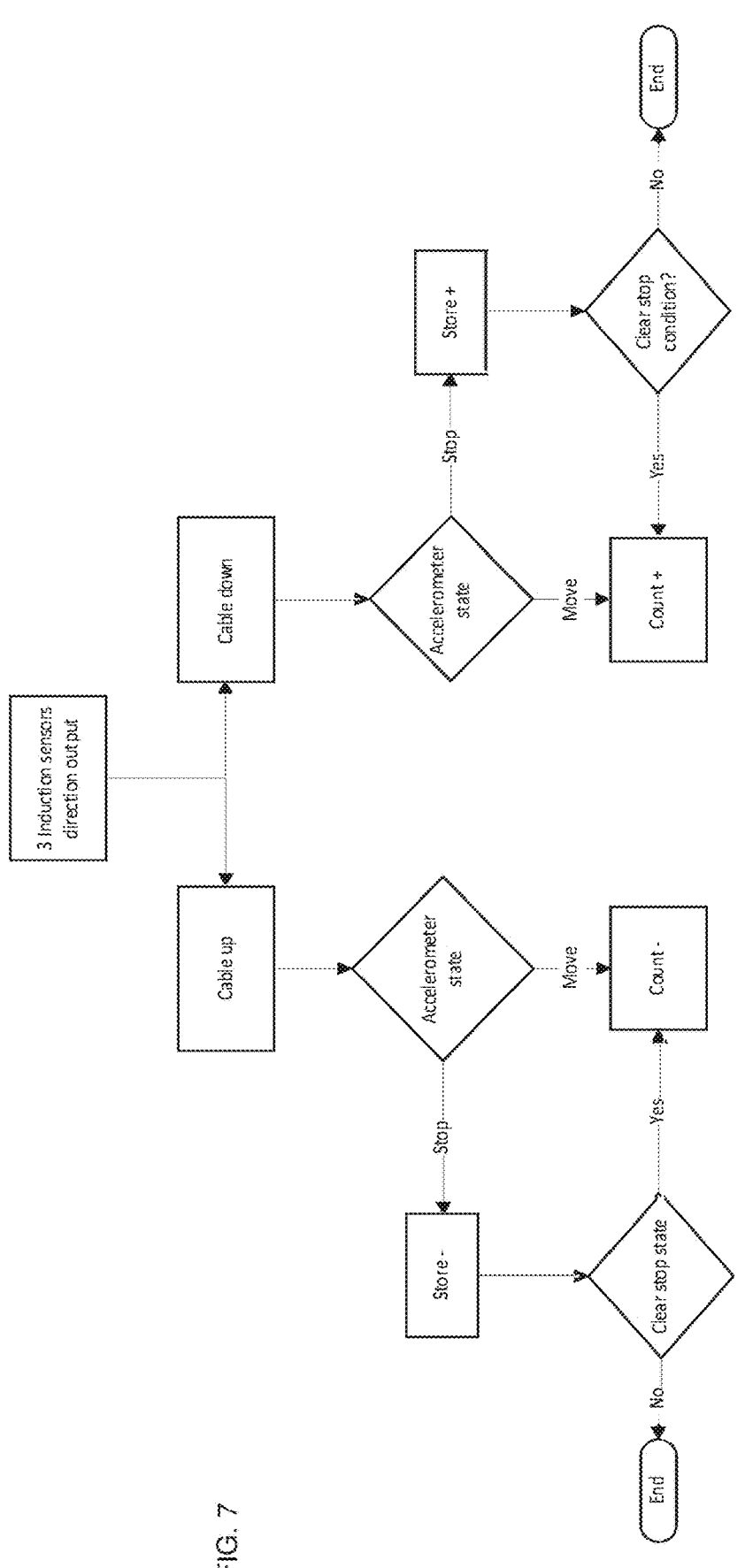
FIG. 7 is a flowchart showing a further method of counting elements.

FIG. 7 shows a more complicated form of counting elements, wherein three sensors are used similar to the process described in relation to FIG. 5. The final count to drop the cable in top the bore hole can be compared to the final count to remove the cable from the hole. In theory they should be the same. However, if they are different, they could be averaged or when the different is significant then would be an indication to retest or that there was an error.

Figure 8:
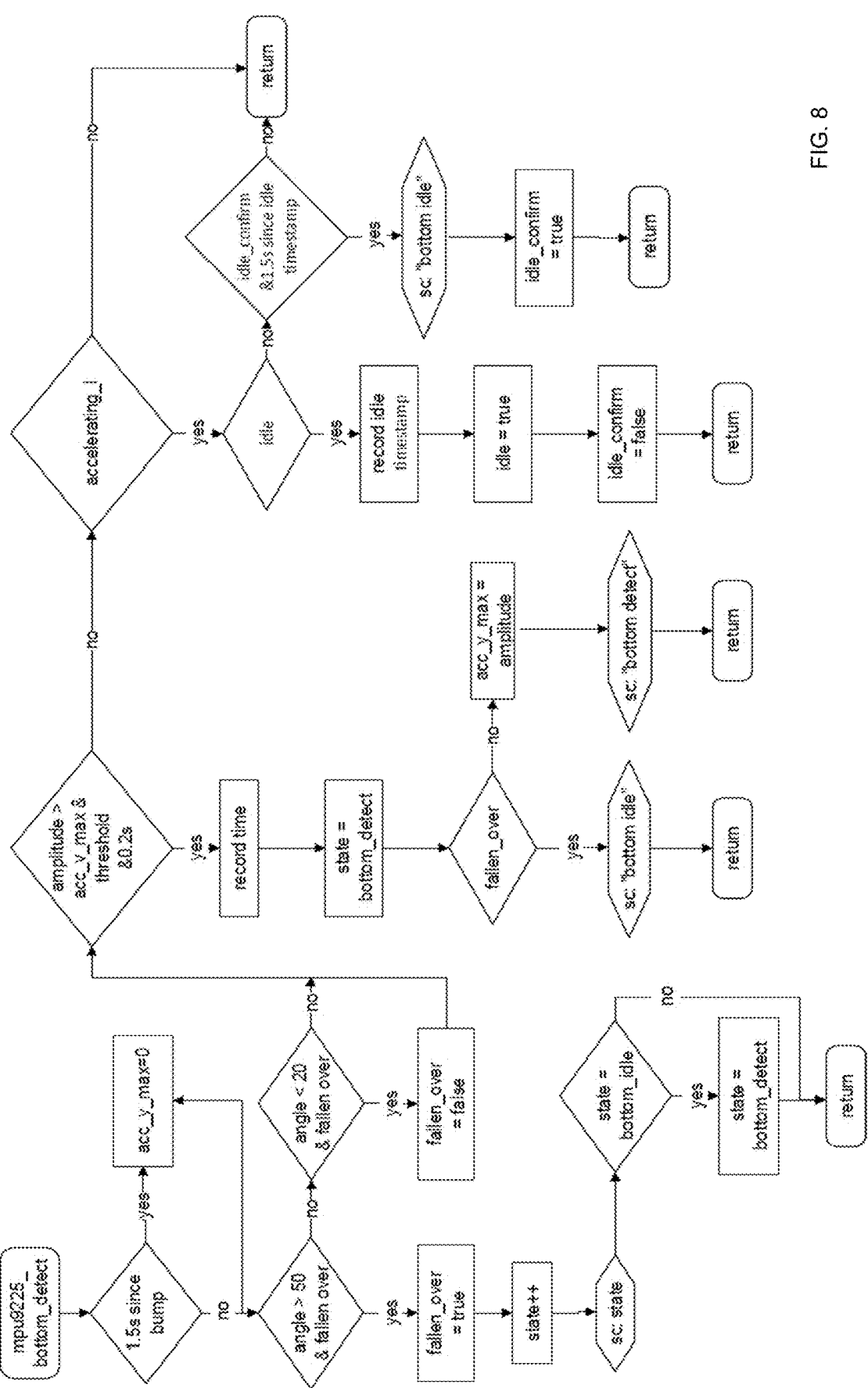
FIG. 8 is a flowchart of a bottom detection process executed by a processor of the computer system of FIG. 1.
Figure 9:
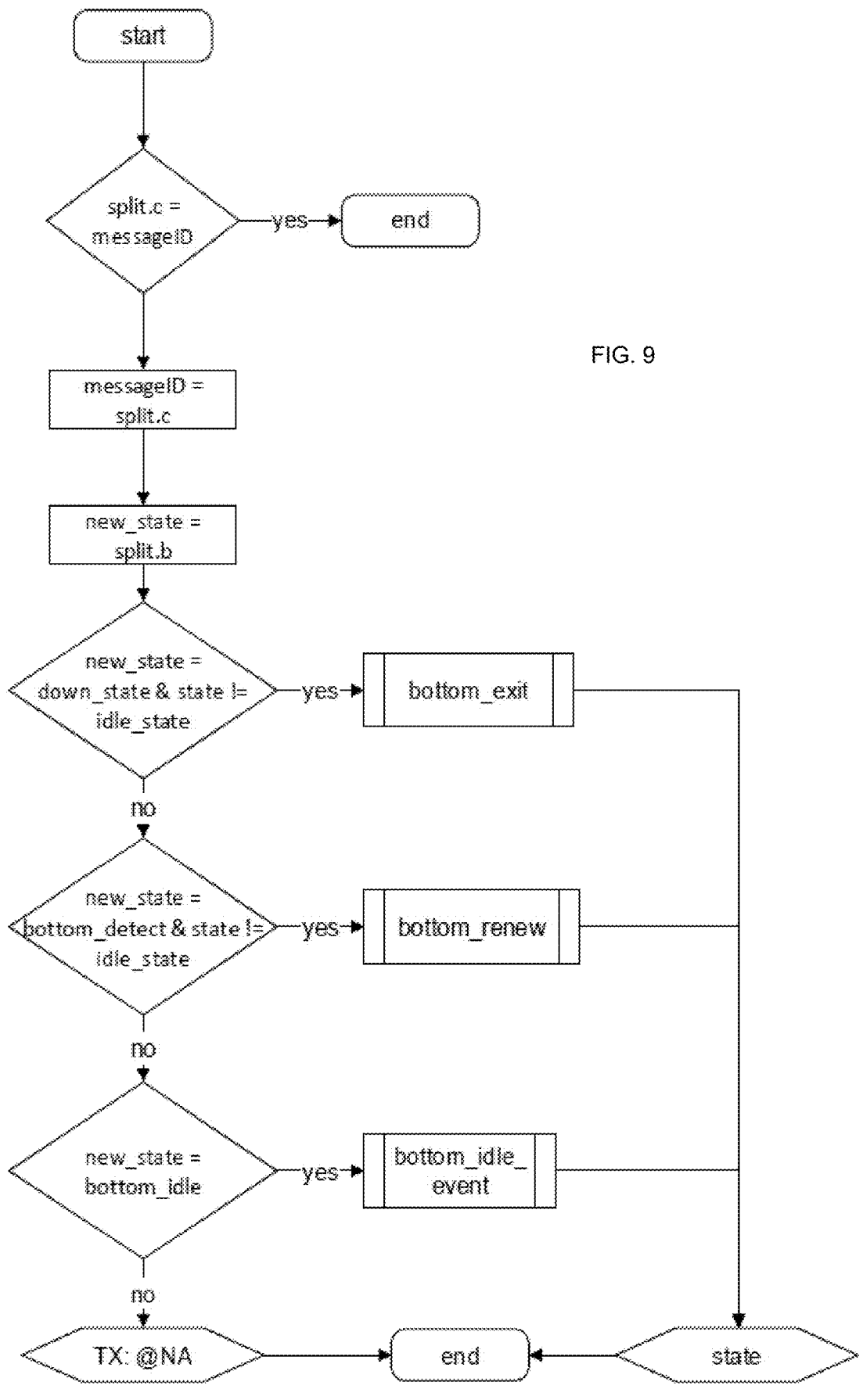
FIG. 9 is a flow chart of a state (of the probe) change process executed by a processor of the computer system of FIG. 1.
Figure 10:
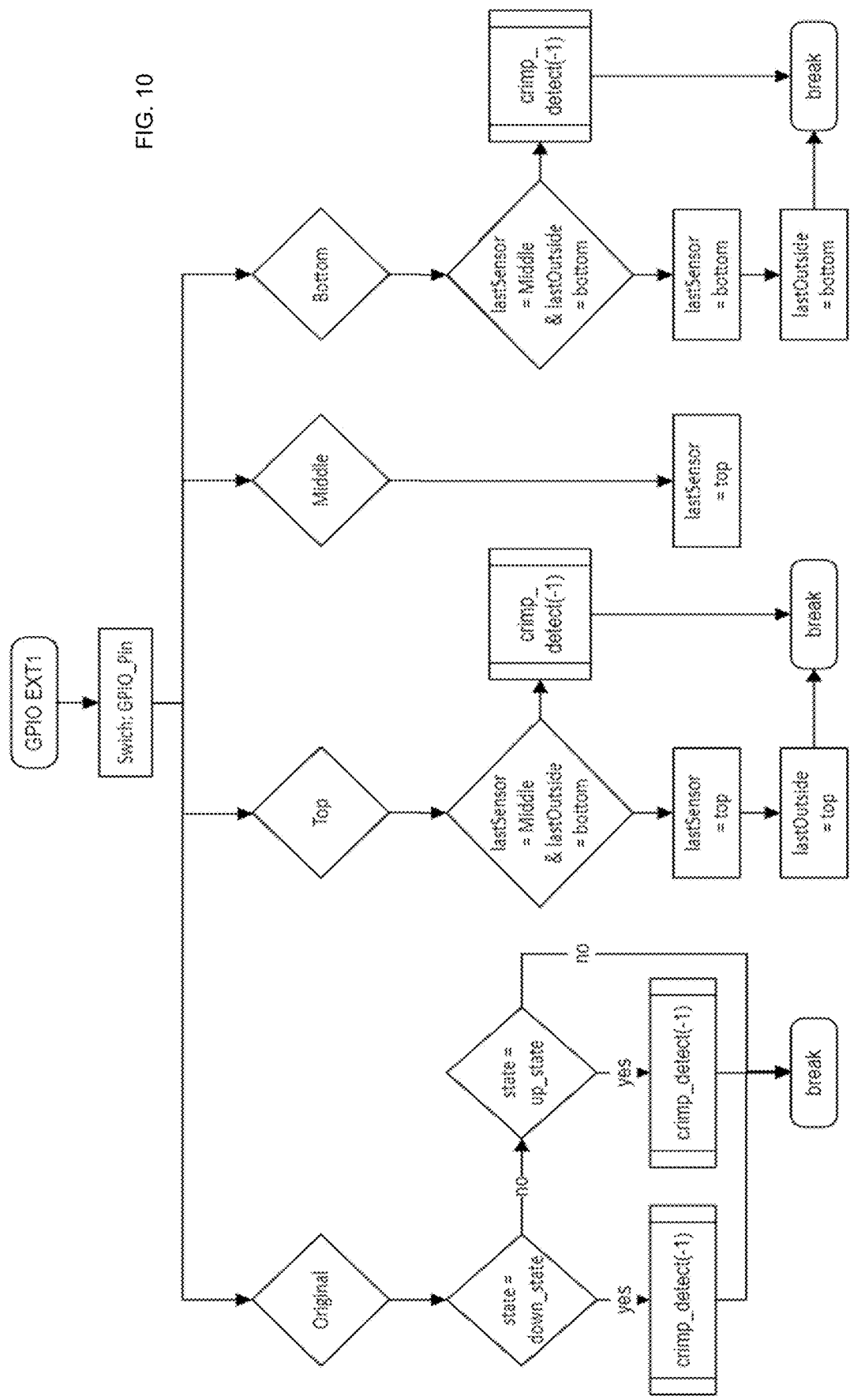
FIGS. 10 and 11 are flow charts of detection of an element (crimp) processes executed by a processor of the computer system of FIG. 1.
Figure 11:
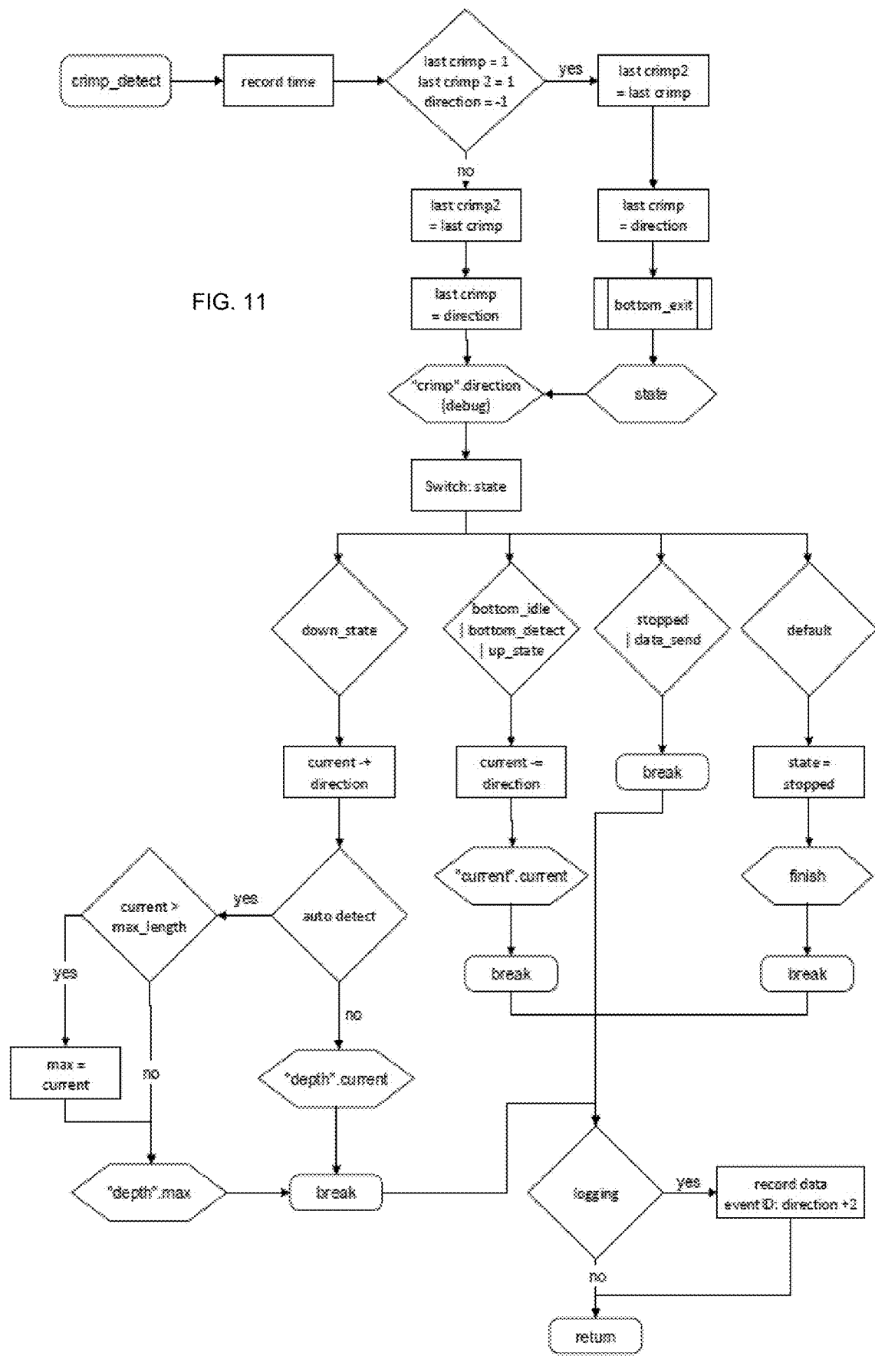

The processor may be configured with instructions which when executed cause the computer to perform as described above. In one embodiment the instructions configure the processor to perform a detection process according to the logical flow of FIG. 8. In one embodiment the instructions configure the processor to perform a state (of the probe) change process according to the logical flow of FIG. 9. In one embodiment the instructions configure the processor to perform detection of an element (crimp) processes according to the logical flow of FIGS. 10 and 11.

The skilled reader would readily appreciate the nature of the materials appropriate for making the components of the embodiments of the arrangements described herein. Modifications and variations as would be apparent to the skilled addressee are intended to be covered by the accompanying claims.

Future patent applications maybe filed in Australia or overseas on the basis of, or claiming priority from, the present application. It is to be understood that the following claims are provided by way of example only and are not intended to limit the scope of what may be claimed in any such future application. Features may be added to or omitted from the provisional claims at a later date so as to further define or re-define the invention or inventions.

What is claimed is:

1. A blast hole measurement system comprising:
   a cable comprising equally spaced apart embedded elements along a length of the cable and comprising an outer protective layer of polyurethane or poly tetrafluoroethylene for protecting against wear damage from a blast hole, the cable comprising electrical wires surrounded by a fiber-glass layer being resistant to stretching over a depth of the blast hole;
   a sensor for detection of the elements as the elements move relatively past the sensor; and
   a processor for determining a distance that the cable has travelled into the blast hole based on the detections of elements that have moved past the sensor.

2. A system according to claim 1, wherein the cable comprises a probe at an end of the cable electrically connected to the electrical wires forming a wire core for transmitting a plurality of signals from the probe, the wire core being suitable for communication over a distance substantially the length of the blast hole, wherein the probe is configured to be lowered into the blast hole for measurement of parameters of the blast hole.

3. A system according to claim 2, wherein the stretch resistance fiber-glass layer comprises reinforced plastic so as to stretch less than 0.05 m per 20 m of cable length.

4. A system according to claim 3, wherein the probe comprises a water detector for detecting that the end of the probe is in contact with water.

5. A system according to claim 4, wherein the probe comprises an accelerometer and the processor is configured to determine the depth of the water based on the number of elements that have moved past the sensor between when the water detector detects that the end of the probe is in contact with water and when the accelerometer detects that the probe encounters the bottom of the blast hole.

6. A system according to claim 2, wherein the probe comprises a temperature sensor for measuring the air a temperature in the blast hole.

7. A system according to claim 2, wherein the probe comprises a distance sensor for detection of a void laterally extending from the blast hole.

8. A system according to claim 2, wherein the processor is configured to compare the parameters of the blast hole to requirements of a blast pattern and to determine whether the blast hole meets the requirements of the blast pattern.

9. A system according to claim 1, wherein the sensor is a magnetic or induction sensor.

10. A system according to claim 1, wherein the elements are metallic crimps around the fiber-glass layer, and underneath the outer protective layer.

11. A system according to claim 1, wherein the outer protective layer is in the form of a single piece extending along the length of the cable.

12. A method of making a measurement of a blast hole comprising:
   providing a cable comprising equally spaced apart embedded elements along a length of the cable;

detecting the elements moving past a sensor;
   determining a distance that the cable has travelled based on the detections of elements that have moved past the sensor, without needing to account for substantial stretching of the cable when deployed in the blast hole;
   determining whether a probe at an end of the cable is in contact with water using a water detector at the end of the probe;
   determining when the probe encounters a bottom of the blast hole using an accelerometer in the probe; and
   wherein, in the event that the water detector detects the end of the probe is in contact with water, determining a depth of the water by a number of detections of elements that have moved past the sensor between when the water detector detects the end of the probe is in contact with water and when the probe encounters the bottom of the blast hole.

13. A method according to claim 12, further comprising recording a temperature at the bottom of the blast hole.

14. A method according to claim 13, further comprising determining whether the temperature exceeds the expected temperature threshold.

15. A method according to claim 12, further comprising recording whether there is a void laterally extending from the blast hole.

16. A method according to claim 15, further comprising determining whether the recorded void in the blast hole meets the requirements of a blast pattern.

17. A method according to claim 12, further comprising comparing the depth of the blast hole and the depth of the water in the blast hole with requirements of a blast pattern and determining whether the blast hole meets the requirements of the blast pattern.

18. A blast hole measurement system comprising:
   a cable comprising spaced apart embedded elements along a length of the cable, the cable being resistant to stretching;
   a sensor for detection of the elements as the elements move relatively past the sensor; and
   a processor for determining a distance that the cable has travelled based on the detections of elements that have moved past the sensor;
   wherein the cable comprises a probe at an end of the cable and an electrical wire core for transmitting a plurality of signals from the wire core, the wire core being suitable for communication over a distance substantially the length of a blast hole,
   wherein the probe comprises a water detector for detecting that the end of the probe is in contact with water;
   wherein the probe comprises an accelerometer and the processor is configured to determine a depth of the water based on a number of elements that have moved past the sensor between when the water detector detects that the end of the probe is in contact with water and when the accelerometer detects that the probe encounters the bottom of the blast hole.

* * * * *